United States Patent
Sakamoto et al.

(10) Patent No.: US 12,444,836 B2
(45) Date of Patent: Oct. 14, 2025

(54) WIRELESS COMMUNICATION APPARATUS AND CONTROL METHOD

(71) Applicant: NTT, Inc., Tokyo (JP)

(72) Inventors: Kazumitsu Sakamoto, Musashino (JP);
Yosuke Fujino, Musashino (JP);
Daisuke Goto, Musashino (JP);
Yasuyoshi Kojima, Musashino (JP);
Kiyohiko Itokawa, Musashino (JP)

(73) Assignee: NTT, Inc., Tokyo (JP)

( * ) Notice: Subject to any disclaimer, the term of this patent is extended or adjusted under 35 U.S.C. 154(b) by 211 days.

(21) Appl. No.: 18/267,316

(22) PCT Filed: Dec. 24, 2020

(86) PCT No.: PCT/JP2020/048475
§ 371 (c)(1),
(2) Date: Jun. 14, 2023

(87) PCT Pub. No.: WO2022/137441
PCT Pub. Date: Jun. 30, 2022

(65) Prior Publication Data
US 2024/0055757 A1 Feb. 15, 2024

(51) Int. Cl.
*H01Q 3/04* (2006.01)
*H01Q 1/12* (2006.01)
*H01Q 1/34* (2006.01)

(52) U.S. Cl.
CPC .......... *H01Q 3/04* (2013.01); *H01Q 1/12* (2013.01); *H01Q 1/34* (2013.01)

(58) Field of Classification Search
CPC .......... H01Q 1/125; H01Q 1/12; H01Q 1/18; H01Q 1/34; H01Q 3/04
See application file for complete search history.

(56) References Cited

U.S. PATENT DOCUMENTS

| | | | | |
|---|---|---|---|---|
| 4,596,989 A | * | 6/1986 | Smith ...................... | H01Q 1/18 343/765 |
| 4,920,350 A | * | 4/1990 | McGuire .................. | H01Q 1/18 343/709 |

(Continued)

OTHER PUBLICATIONS

Narumi Noboru et al., Three-Axis Turrent for Camera Tracking System, Toshiba Review vol. 59, No. 10 (2004).

*Primary Examiner* — Peter M Bythrow
(74) *Attorney, Agent, or Firm* — Harness, Dickey & Pierce, P.L.C.

(57) ABSTRACT

A communication device includes an antenna, a support portion, an actuator, a floating body, a sensor, and a control device. The antenna has a rod-shaped element. The instruction unit supports the antenna rotatably about a rotation axis orthogonal to an extending direction of the element. The actuator rotates the antenna about the rotation axis. The floating body supports the support portion and floats on water. The sensor measures a physical quantity related to inclination of the support portion. The control device includes a measurement value acquisition unit and a rotation control unit. The measurement value acquisition unit acquires a measurement value of the sensor. The rotation control unit drives the actuator on the basis of the measurement value to match a direction in which a change in the inclination is smallest with an extending direction of the antenna.

7 Claims, 6 Drawing Sheets

(56) References Cited

U.S. PATENT DOCUMENTS

| | | | | |
|---|---|---|---|---|
| 5,383,363 | A * | 1/1995 | Kulmaczewski | G01P 15/0888 73/510 |
| 5,517,204 | A * | 5/1996 | Murakoshi | H01Q 1/18 74/5.34 |
| 6,023,247 | A * | 2/2000 | Rodeffer | H01Q 1/3275 343/765 |
| 6,236,351 | B1 * | 5/2001 | Conner | G01S 13/953 342/75 |
| 8,060,146 | B2 * | 11/2011 | Takamatsu | H01Q 1/42 342/359 |
| 8,330,651 | B2 * | 12/2012 | Vacanti | H01Q 3/04 342/195 |
| 9,000,995 | B2 * | 4/2015 | Blaney | H01Q 25/00 343/765 |
| 10,031,220 | B2 * | 7/2018 | Takemoto | G01S 13/86 |
| 10,218,047 | B2 * | 2/2019 | Nakamoto | H01Q 1/1207 |
| 10,396,426 | B2 * | 8/2019 | Michaelis | H01Q 1/125 |
| 11,264,694 | B2 * | 3/2022 | Enano | H01Q 1/18 |
| 11,391,849 | B2 * | 7/2022 | Amaki | G01S 19/38 |
| 2002/0029110 | A1 * | 3/2002 | Fukuda | G01S 19/55 701/470 |
| 2002/0178815 | A1 * | 12/2002 | Challoner | G01C 19/42 73/504.16 |
| 2003/0232633 | A1 * | 12/2003 | Lida | H01Q 3/2605 455/562.1 |
| 2004/0135735 | A1 * | 7/2004 | Naym | H01Q 1/18 343/882 |
| 2006/0114164 | A1 * | 6/2006 | Iluz | H01Q 3/04 342/359 |
| 2007/0001920 | A1 * | 1/2007 | Webb | H01Q 3/005 343/702 |
| 2007/0046537 | A1 * | 3/2007 | Tekawy | G01S 19/02 342/357.395 |
| 2007/0241979 | A1 * | 10/2007 | Yang | H01Q 1/246 343/765 |
| 2010/0149059 | A1 * | 6/2010 | Patel | H01Q 3/08 343/765 |
| 2010/0201589 | A1 * | 8/2010 | Hellberg | H01Q 1/288 343/763 |
| 2011/0021166 | A1 * | 1/2011 | Walley | H01Q 3/24 455/272 |
| 2011/0196581 | A1 * | 8/2011 | Zurfluh | H01Q 1/10 701/49 |
| 2011/0241971 | A1 * | 10/2011 | Bateman | H01Q 1/125 343/882 |
| 2011/0304496 | A1 * | 12/2011 | Yakubovich | H01Q 19/192 342/359 |
| 2012/0001816 | A1 * | 1/2012 | Blaney | H01Q 3/08 343/765 |
| 2012/0280853 | A1 * | 11/2012 | Silander | G01S 13/72 342/147 |
| 2014/0299734 | A1 * | 10/2014 | Nielsen | H01Q 1/12 248/560 |
| 2014/0300888 | A1 * | 10/2014 | Duffey | G01S 7/497 356/28 |
| 2016/0020504 | A1 * | 1/2016 | Michaelis | H01Q 1/125 342/359 |
| 2016/0226136 | A1 * | 8/2016 | Paleta, Jr. | H01Q 19/13 |
| 2016/0336652 | A1 * | 11/2016 | Yoshida | H01Q 3/08 |
| 2017/0059445 | A1 * | 3/2017 | Fujisawa | G01M 5/0041 |
| 2018/0040951 | A1 * | 2/2018 | Uchiyama | H01Q 3/08 |
| 2018/0375187 | A1 * | 12/2018 | Rao | H04B 7/00 |
| 2019/0393930 | A1 * | 12/2019 | Wahlberg | H01Q 3/04 |
| 2021/0184348 | A1 * | 6/2021 | Hogeman | H01Q 1/405 |

* cited by examiner

WIRELESS COMMUNICATION APPARATUS AND CONTROL METHOD

CROSS-REFERENCE TO RELATED APPLICATIONS

This application is a 371 National Stage of International Application No. PCT/JP2020/048475, filed on Dec. 24, 2020. The entire disclosures of the above applications are incorporated herein by reference.

TECHNICAL FIELD

The present invention relates to a wireless communication device (a wireless communication apparatus) and a control method.

BACKGROUND ART

With the development of Internet of things (IoT) technology, installing IoT terminals including various sensors in various places has been considered. For example, it is assumed that IoT is used to collect data at a place where it is difficult to install a base station, such as a buoy or a ship on the sea. It is considered that an unmanned aerial vehicle (UAV) or an artificial satellite collects data acquired by such an IoT terminal.

In a case where an IoT terminal is provided on the sea, there is a possibility that the direction of the directivity of an antenna changes due to shaking by a wave during transmission of a signal, and the reception level of the signal fluctuates. Non Patent Literature 1 discloses a three-axis turret for a camera tracking system that tracks an object. Supporting the antenna with the turret as described in Non Patent Literature 1 makes it possible to suppress a change in the direction of the antenna.

CITATION LIST

Non Patent Literature

Non Patent Literature 1: Noboru NARUMI, Kenichi ARAKAWA, and Takeshi TOYOSHIMA, "Three-Axis Turret for Camera Tracking System", Toshiba Review, Vol. 59, No. 10, 2004

SUMMARY OF INVENTION

Technical Problem

Non Patent Literature 1 discloses a device having three-axis gimbal configuration. On the other hand, the configuration of a turret is more complicated as the number of controllable axes increases, and the device size and power consumption increase.

An object of the present invention is to provide a wireless communication device and a control method capable of maintaining the direction of the directivity of an antenna with a simple configuration.

Solution to Problem

One aspect of the present invention is a wireless communication device including: an antenna having an element rod-shaped; a support portion that supports the antenna rotatably about a rotation axis orthogonal to an extending direction of the element; an actuator that rotates the antenna about the rotation axis; a floating body that supports the support portion and floats on water; a sensor that measures a physical quantity related to inclination of the support portion and a control device, wherein the control device includes a measurement value acquisition unit that acquires a measurement value of the sensor and a rotation control unit that drives the actuator on a basis of the measurement value to match a direction in which a change in the inclination is smallest with the extending direction of the antenna.

One aspect of the present invention is a control method for a wireless communication device including an antenna having an element rod-shaped, a support portion that supports the antenna rotatably about a rotation axis orthogonal to an extending direction of the antenna, an actuator that rotates the antenna about the rotation axis, a floating body that supports the support portion and floats on water, and a sensor that measures a physical quantity related to inclination of the support portion, the control method including: a step of acquiring a measurement value of the sensor; and a step of driving the actuator to match a direction in which a change in the inclination indicated by the measurement value is smallest with the extending direction of the antenna.

Advantageous Effects of Invention

According to the above aspects, the direction of the directivity of an antenna can be maintained with a simple configuration.

DESCRIPTION OF EMBODIMENTS

First Embodiment

Figure 1:
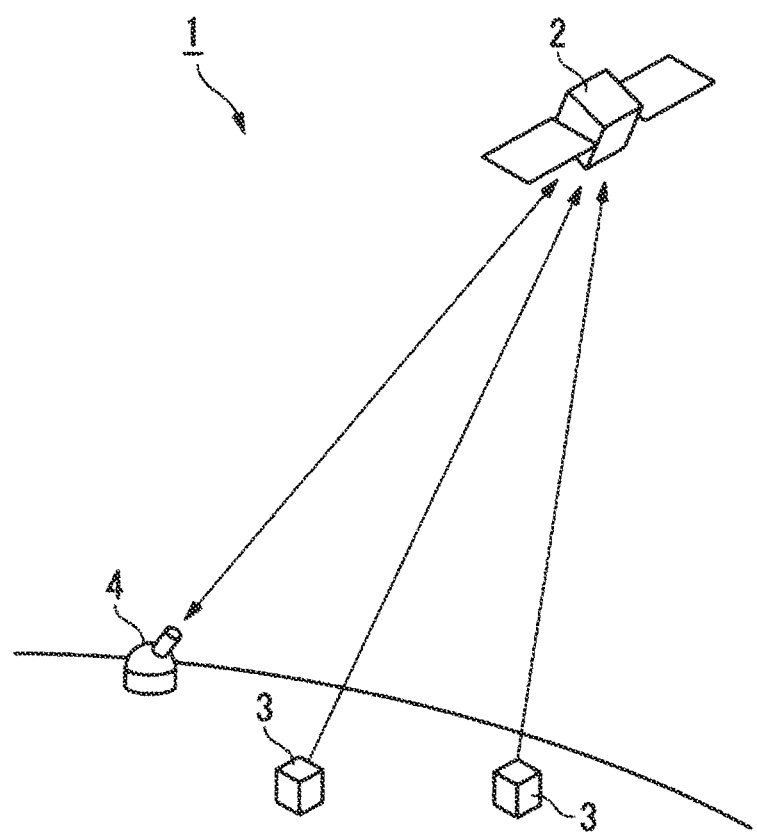
FIG. 1 is a configuration diagram of a wireless communication system according to a first embodiment.

FIG. 1 is a configuration diagram of a wireless communication system 1 according to a first embodiment. The wireless communication system 1 includes a mobile relay station 2, terminal stations 3, and a base station 4. Although the number of each of the mobile relay station 2, the terminal stations 3, and the base station 4 included in the wireless communication system 1 is any number, it is assumed that the number of the terminal stations 3 is large.

The mobile relay station 2 is an example of a relay device that is mounted on a mobile object and whose communicable area moves with the lapse of time. The mobile relay station 2 is provided in, for example, a low earth orbit (LEO) satellite. The altitude of the LEO satellite is 2000 km or less, and the LEO satellite goes around the earth in about 1.5 hours. The terminal stations 3 and the base station 4 are installed on the earth such as on the ground or on the sea. Each of the terminal stations 3 is, for example, an IoT terminal. Each of the terminal stations 3 collects data such as environmental data detected by a sensor and wirelessly transmits the collected data to the mobile relay station 2. FIG. 1 illustrates only two terminal stations 3. The mobile relay station 2 receives the data transmitted from each of the plurality of terminal stations 3 by a wireless signal while moving over the earth, and wirelessly transmits the received data to the base station 4. The base station 4 receives the data collected by the terminal stations 3 from the mobile relay station 2.

As the mobile relay station 2, a relay station mounted on an unmanned aerial vehicle such as a geostationary satellite, a drone, or a high altitude platform station (HAPS) may be used. However, in a case where the mobile relay station 2 is mounted on a geostationary satellite, although the coverage area (footprint) on the ground is larger than that in the case where the mobile relay station 2 is mounted on the LEO satellite, the link budget for the IoT terminals installed on the ground is smaller because the altitude is higher. On the other hand, in a case where the mobile relay station 2 is mounted on an unmanned aerial vehicle, the link budget is higher than that in the case where the mobile relay station 2 is mounted on the LEO satellite, but the coverage area is smaller. In addition, the unmanned aerial vehicle requires a power source (for example, a battery or a solar panel) to maintain altitude.

Figure 2:
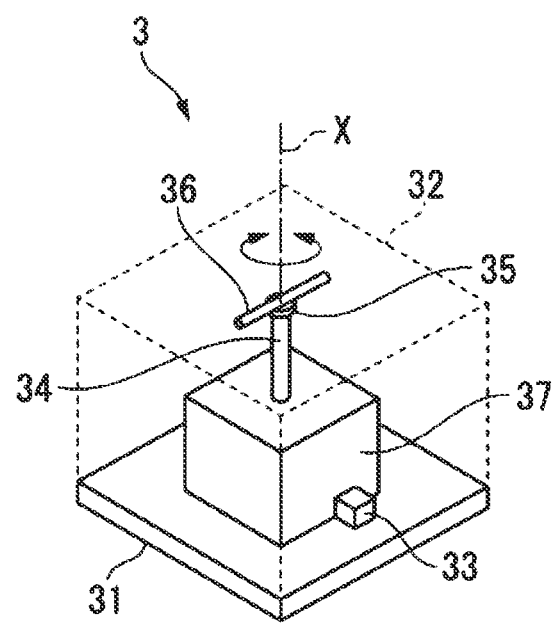
FIG. 2 is a perspective view illustrating an appearance of a terminal station according to the first embodiment.

FIG. 2 is a perspective view illustrating an appearance of one of the terminal stations 3 according to the first embodiment. Among the terminal station 3, one provided on water includes at least a floating body 31, a housing 32, a sensor group 33, a support portion 34, an actuator 35, an antenna 36, and a control device 37. The floating body 31 is a structure that floats on water. The housing 32 forms an outer shell of the terminal station 3. The housing 32 has high radio wave transparency and waterproofness.

The sensor group 33 is attached to the floating body 31 and measures various physical quantities. In addition, the sensor group 33 includes at least a sensor that measures a physical quantity related to inclination of the floating body 31 with respect to the vertical direction. For example, the sensor group 33 includes a three-axis acceleration sensor. The inclination of the floating body 31 with respect to the vertical direction can be specified by the direction of the gravitational acceleration being detected on the basis of a measurement value of the acceleration. Furthermore, for example, the sensor group 33 may include at least three pressure sensor groups provided on a bot surface of the floating body 31. The inclination of the floating body 31 with respect to the vertical direction can be specified on the basis of the distribution of a water pressure applied to the bottom surface of the floating body 31 based on measurement value of the pressure.

The support portion 34 rotatably supports the antenna 36 about a rotation axis X. The rotation axis X is provided so as to be vertical when the terminal station 3 is floated on a water surface without waves. In the example illustrated in FIG. 2, the support portion 34 is provided on the control device 37, but the position where the support portion 34 is provided is not limited thereto. The actuator 35 rotates the antenna 36 about the rotation axis X. The antenna 36 has a rod-shaped element arranged on a straight line. Examples of the antenna 36 include a dipole antenna, in which two elements are linearly arranged, a monopole antenna, a whip antenna, and a sleeve antenna. That is, the antenna 36 has a toroidal directivity that is rotationally symmetric with respect to the axis of the element. The antenna 36 is provided such that the axis of the element is orthogonal to the rotation axis X. That is, the antenna 36 is provided so as to be horizontal when the terminal station 3 is floated on a water surface without waves. Furthermore, the rotation center of the antenna 36 with respect to the rotation axis is the center of an electric field formed by the antenna 36. That is, in a case where the antenna 36 is a dipole antenna, the rotation center is in the middle between the two elements. In a case where the antenna 30 is a monopole antenna or a whip antenna, the rotation center is in the middle between the element and a ground plane. In a case where the antenna 36 is a sleeve antenna, the rotation center is in the middle between the element (an exposed portion of an inner conductive wire of a coaxial cable) and a sleeve.

Figure 3:
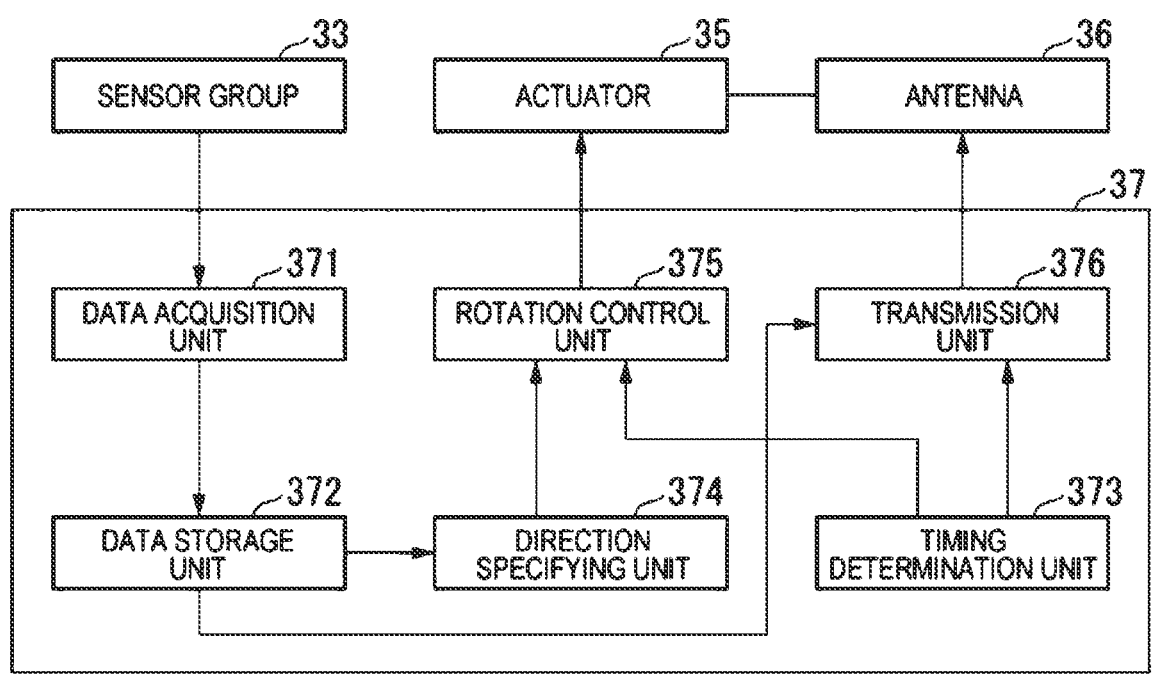
FIG. 3 is a block diagram illustrating a configuration of the terminal station according to the first embodiment.

The control device 37 controls the actuator 35 and transmits a signal to the mobile relay station 2. FIG. 3 is a block diagram illustrating a configuration of one of the terminal stations 3 according to the first embodiment. The control device 37 includes a data acquisition unit 371, a data storage unit 372, a timing determination unit 373, a direction specifying unit 374, a rotation control unit 375, and a transmission unit 376.

The data acquisition unit 371 acquires sensor data from the sensor group 33 and records the sensor data in the data storage unit 372. The timing determination unit 373 determines a signal transmission period on the basis of orbit information of the LEO satellite and the position of the terminal station 3. The orbit information of the LEO is information from which the position, velocity, movement direction, and the like of the LEO satellite at any time can be obtained. That is, the timing determination unit 373 calculates transition of a communicable range of the mobile relay station 2 on the basis of the orbit information of the LEO satellite, and specifies a time zone in which the position of the terminal station 3 is included in the communicable range.

The direction specifying unit 374 specifies a direction orthogonal to the traveling direction of water surface waves on the basis of sensor data of a sensor among the sensor group 33 that measures a physical quantity related to the inclination of the floating body 31 with respect to the vertical direction. For example, the direction specifying unit 374 specifies a time series of inclinations for rotation angles about the rotation axis X from the sensor data, and specifies a rotation angle having the smallest amount of change in inclination. The direction facing the specified rotation angle is the direction orthogonal to the traveling direction of the water surface waves.

The rotation control unit 375 controls the actuator 35 to match the direction specified by the direction specifying unit 374 with the extending direction of the antenna 36 during the transmission period determined by the timing determination unit 373. The transmission unit 376 wirelessly transmits a terminal uplink signal in which the sensor data is set from the data storage unit 372 via the antenna 36 during the transmission period determined by the timing determination unit 373. The transmission unit 376 transmits the signal by a low power wide area (LPWA), for example. Examples of the LPWA includes LoRaWAN (registered trademark), Sigfox (registered trademark), Long Term Evolution for Machines (LTE-M), Narrow Band (NB)-IoT, and the like, but any wireless communication scheme can be used. Furthermore, the transmission unit 376 may transmit the signal to another terminal station 3 by time division multiplexing, orthogonal frequency division multiplexing (OFDM), MIMO, or the like. The transmission unit 376 determines a channel and a transmission timing to be used for transmission of the terminal uplink signal by the own station by using a method determined in advance in the wireless communication scheme to be used. Furthermore, the transmission unit 376 may perform beam formation of signals transmitted from a plurality of antennas 36 by using a method determined in advance in the wireless communication scheme to be used.

An operation of one of the terminal stations 3 will be described.

Figure 4:
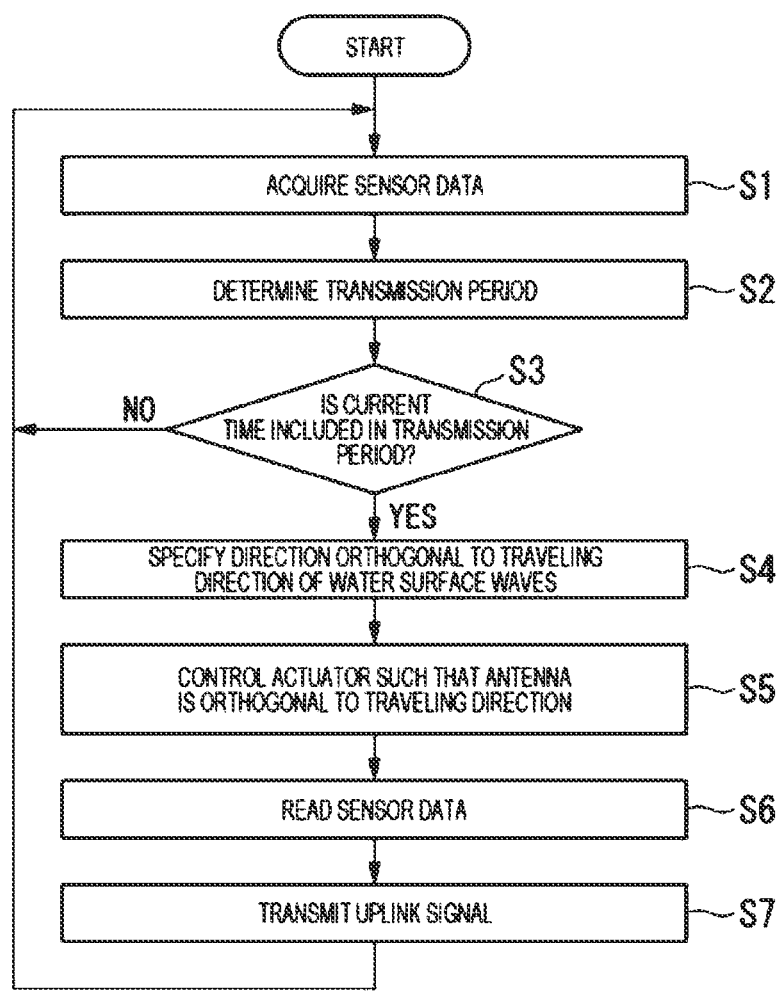
FIG. 4 is a flowchart illustrating an operation of the terminal station according to the first embodiment.

FIG. 4 is a flowchart illustrating an operation of the terminal station 3 according to the first embodiment. The data acquisition unit 371 of the terminal station 3 acquires sensor data detected by the sensor group 33 and writes the acquired sensor data in the data storage unit 372 (step S1). The timing determination unit 373 determines the next transmission period on the basis of orbit information of the LEO satellite and the position of the terminal station 3 (step S2). The timing determination unit 373 determines whether the current time is included in the transmission period (step S3). That is, the timing determination unit 373 determines whether the current time is a signal transmission timing.

In a case where the current time is not included in the transmission period (step S3: NO), the processing returns to step S1 and the acquisition of the sensor data is continued. In a case where the current time is included in the transmission period (step S3: YES), the direction specifying unit 374 specifies a direction orthogonal to the traveling direction of water waves on the basis of data stored in the data storage unit 372 (step S4). The rotation control unit 376 outputs a signal for controlling the actuator 35 such that the extending direction of the antenna 36 faces the direction specified by the direction specifying unit 374 (step S5). The transmission unit 376 reads the sensor data from the data storage unit 372 (step S5). The transmission unit 376 wirelessly transmits terminal uplink signal in which the read sensor data is set from the antenna 36 (step S7). The control device 37 then returns the processing to step S1.

As a result, the control device 37 rotates the antenna 36 by the actuator 35 and transmits the signal from the antenna 36 during the signal transmission period. That is, the rotation control unit 375 of the control device 37 starts driving of the actuator 35 at the transmission timing and continues the driving of the actuator 35 until the transmission of the signal is completed. As a result, the terminal station 3 can transmit the signal while maintaining a state in which the extending direction of the antenna 36 is orthogonal to the traveling direction of the water surface waves. Maintaining the state in which the extending direction of the antenna 36 is orthogonal to the traveling direction of the water surface waves makes it possible to maintain the transmission strength of the signal upward in the vertical direction. Hereinafter, a reason of this will be described.

Figure 5:
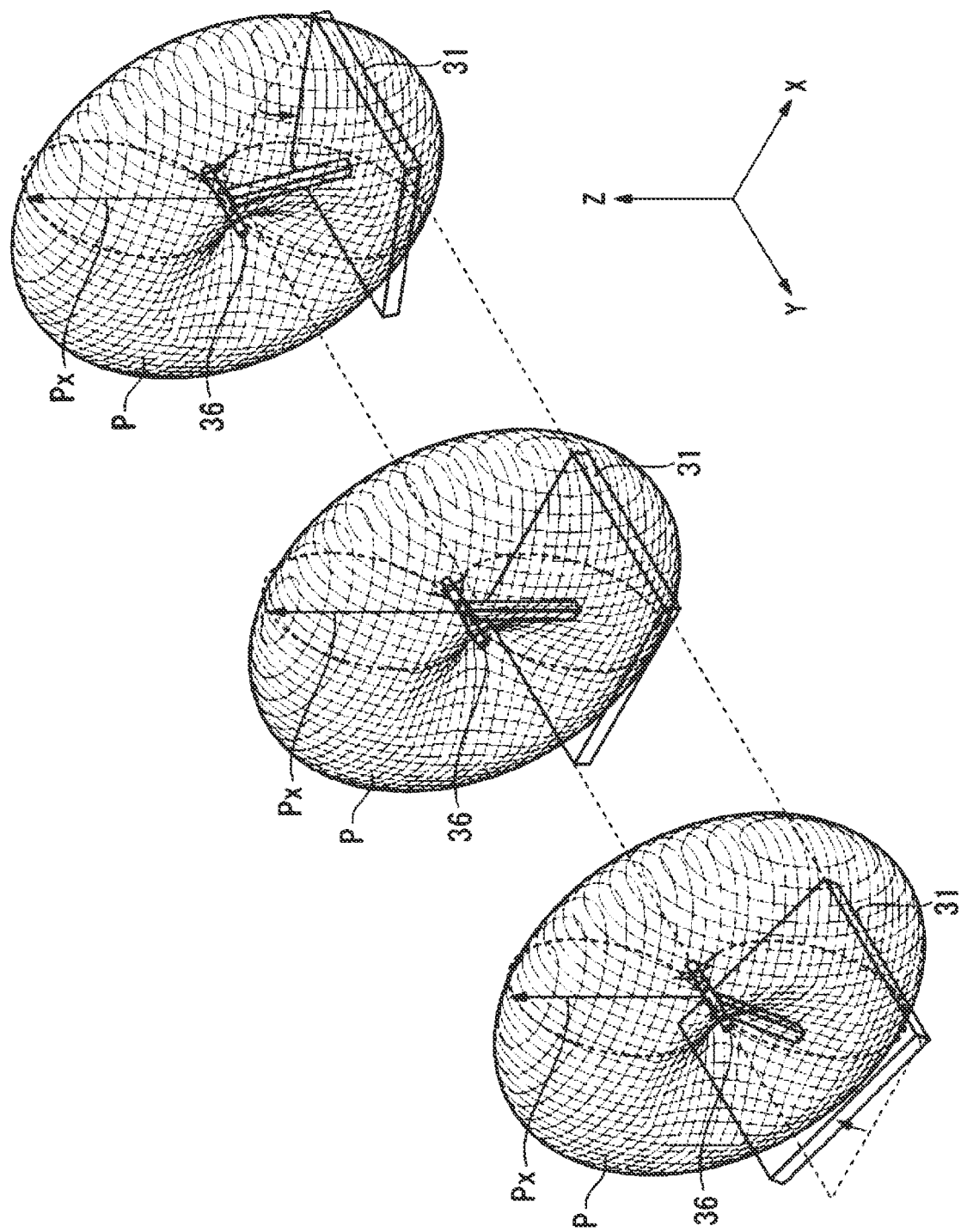
FIG. 5 is a diagram illustrating an example of a change in a directivity pattern a state in which the extending direction of an antenna orthogonal to the traveling direction of water surface waves is maintained.

FIG. 5 is a diagram illustrating an example of a change in a directivity pattern when the state in which the extending direction of the antenna 36 is orthogonal to the traveling direction of the water surface waves is maintained. In the example illustrated in FIG. 5, the vertical direction is referred to as a Z-axis direction, the traveling direction of the water surface waves in the horizontal direction is referred to as an X-axis direction, and the direction orthogonal to the X-axis is referred to as a Z-axis direction. In the example illustrated in FIG. 5, the extending direction of the antenna 36 is orthogonal to the traveling direction of the water surface waves. That is, the extending direction of the antenna 36 faces the Y-axis direction. Since the antenna 36 is an antenna having a toroidal directivity pattern, such as a dipole antenna or monopole antenna, a directivity pattern P is rotationally symmetric with respect to the extending direction of the antenna 36. Therefore, even if a water surface wave rotates the antenna 36 about the Y-axis orthogonal to the traveling direction of the water surface waves, the directivity pattern P is maintained. That is, it is possible to prevent fluctuation of a signal intensity Px upward in the vertical direction.

Figure 6:
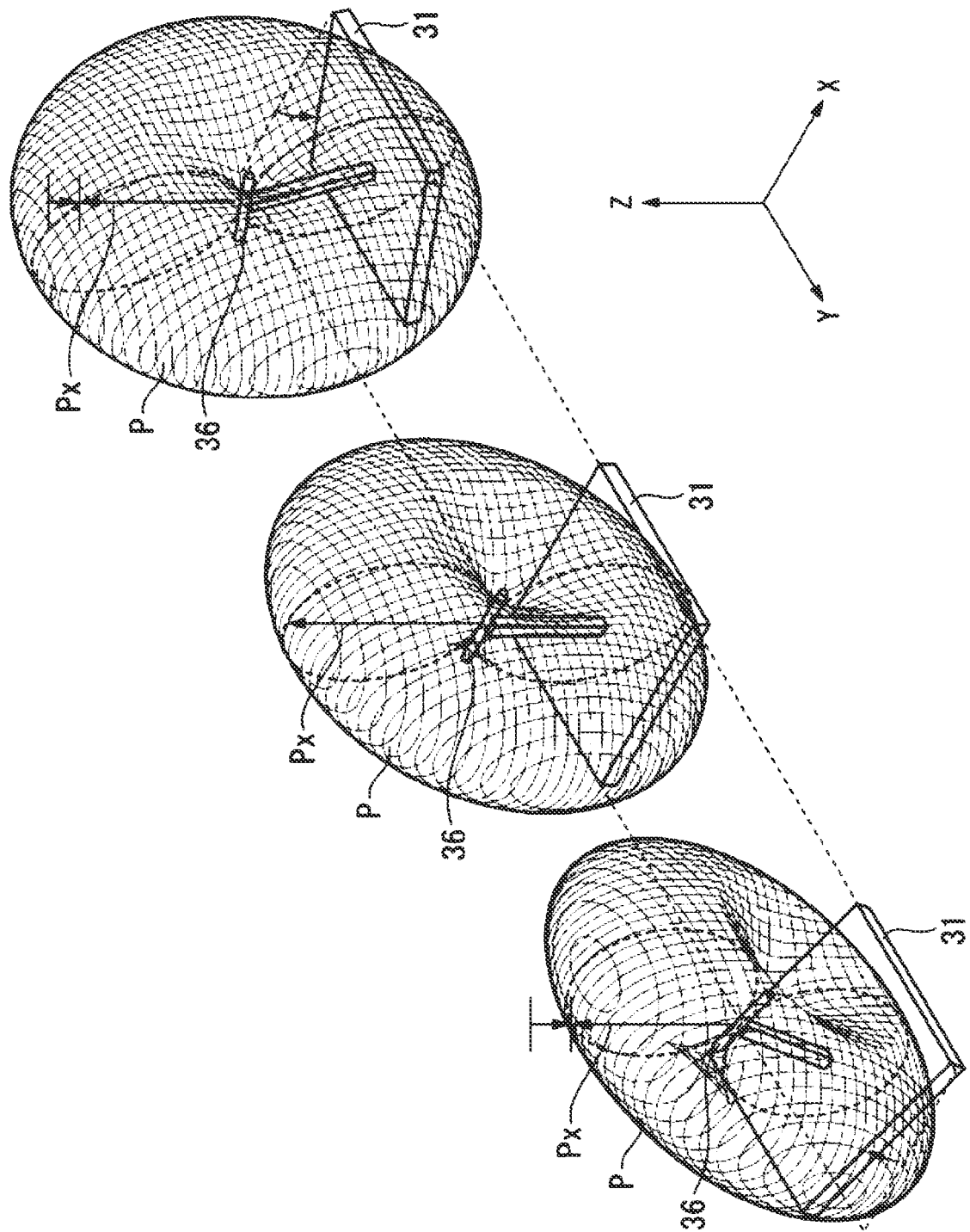
FIG. 6 is a diagram illustrating an example of a change in the directivity pattern when the extending direction of the antenna is not orthogonal to the traveling direction of the water surface waves.

FIG. 6 is a diagram illustrating an example of a change in the directivity pattern when the extending direction of the antenna 36 is not orthogonal to the traveling direction of the water surface waves. In the example illustrated in FIG. 6, the extending direction of the antenna 36 faces the traveling direction of the water surface waves. That is, the extending direction of the antenna 36 faces the X-axis direction. The directivity pattern P of the antenna 36 is rotationally symmetric with respect to the extending direction of the antenna 36, and thus, when a water surface wave rotates the antenna 36 about the Y-axis, the directivity pattern P is rotated about an axis orthogonal to the axis of rotational symmetry. Therefore, in a case where the extending direction of the antenna 36 is not orthogonal to the traveling direction of the water surface waves, the signal intensity Px upward in the vertical direction decreases as inclination with respect to the horizontal plane increases.

<Computer Configuration>

The control device 37 includes a processor, memory, an auxiliary storage device, and the like connected by a bus, and executes a communication program to function as a device including the data acquisition unit 371, the data storage unit 372, the timing determination unit 373, the direction specifying unit 374, the rotation control unit 375, and the transmission unit 376. Examples of the processor include a central processing unit (CPU), a graphic processing unit (GPV), and a microprocessor.

The communication program may be recorded on a computer-readable recording medium. The computer-readable recording medium is, for example, a storage device such as a magnetic disk, a magneto-optical disk, an optical disk, or a semiconductor memory. The communication program may be transmitted via an electrical communication line.

Note that all or some of the functions of the control device 37 may be implemented by use of a custom large scale integrated circuit (LSI) such as an application specific integrated circuit (ASIC) or a programmable logic device (PLD). Examples of the PLD include a programmable array logic (PAL), a generic array logic (GAL), a complex programmable logic device (CPLD), and a field programmable gate array (FPGA). Such an integrated circuit is also included in the examples of the processor.

According to the embodiment described above, the control device 37 drives the actuator 35 to match the direction in which the change in the inclination of the floating body 31 is the smallest with the extending direction of the antenna 36, whereby the state in which the extending direction of the antenna 36 is orthogonal to the traveling direction of the water surface waves can be maintained as illustrated in FIG. 5. Therefore, the terminal station 3 can maintain the direction of the directivity of the antenna 36 with a simple configuration in which the number of rotation axes X to be controlled is small.

In the above-described embodiment, each of the terminal stations 3 is a wireless communication device. On the other hand, the base station 4 may be a wireless communication device according to another embodiment.

Each of the terminal stations 3 according to the above-described embodiment includes one actuator 35 that rotates the antenna 36 about the rotation axis X orthogonal to the extending direction of the antenna 36. On the other hand, a terminal station 3 according to another embodiment may further include another or that rotates the antenna 36 about a rotation axis orthogonal to the rotation axis X and the extending direction of the antenna 36. According to the above-described embodiment, it is possible to suppress the influence of shaking in the main traveling direction of the water surface waves, but there may also be a wave in the direction orthogonal to the main traveling direction. In this case, the control device 37 drives the other actuator, so that it is possible to suppress all the shaking with respect to the horizontal plane. Note that, since a wave traveling in the direction orthogonal to the main traveling direction is sufficiently smaller than a wave traveling in the main traveling direction, the direction of the directivity can be sufficiently maintained even by the antenna 36 being rotated with respect to one rotation axis X as in the above-described embodiment.

In the above-described embodiment, among the terminal stations 3, one provided on water has at least the structure illustrated in FIG. 2. On the other hand, a terminal station 3 provided on the ground may not have a configuration for rotatably supporting the antenna 36.

Although the embodiment of the present invention has been described in detail with reference to the drawings, specific configurations are not limited to the embodiment, and include design and the like within a range not departing from the gist of the present invention.

REFERENCE SIGNS LIST

1 Wireless communication system
2 Mobile relay station
3 Terminal station
31 Floating body
32 Housing
33 Sensor group
34 Support portion
35 Actuator
36 Antenna
37 Control device
371 Data acquisition unit
372 Data storage unit
373 Timing determination unit
374 Direction specifying unit
375 Rotation control unit
376 Transmission unit
4 Bas station
X Rotation axis

The invention claimed is:

1. A wireless communication device comprising:
an antenna having an element rod-shaped;
a support portion supporting the antenna rotatably about a rotation axis orthogonal to an extending direction of the element;
an actuator configured to rotate the antenna about the rotation axis;
a floating body supporting the support portion and capable of floating on water;
a sensor configured to measure a physical quantity related to inclination of the support portion; and
a control device, wherein
the control device comprising one or more processors configured to perform as:
a measurement value acquisition unit configured to acquire a measurement value of the sensor; and
a rotation control unit configured to drive the actuator according to the measurement value to match a direction in which a change in the inclination is smallest with the extending direction of the antenna.

2. The wireless communication device according to claim 1, wherein
the support portion supports the antenna to make the extending direction of the antenna horizontal when the floating body floats on a water surface without waves.

3. The wireless communication device according to claim 1, wherein
the one or more processors are further configured to perform as:
a timing determination unit configured to determine a transmission timing of a signal; and
a transmission unit configured to transmit the signal at the transmission timing, and
the rotation control unit drives the actuator at the transmission timing.

4. The wireless communication device according to claim 3, wherein
the rotation control unit drives the actuator until the transmission of the signal is completed.

5. A control method for a wireless communication device, the wireless communication device including
an antenna having an element rod-shaped,
a support portion supporting the antenna rotatably about a rotation axis orthogonal to an extending direction of the antenna,
an actuator configured to rotate the antenna about the rotation axis,
a floating body supporting the support portion and capable of floating on water, and
a sensor configured to measure a physical quantity related to inclination of the support portion,
the control method comprising:
acquiring a measurement value of the sensor; and
driving the actuator to match a direction in which a change in the inclination indicated by the measurement value is smallest with the extending direction of the antenna.

6. The wireless communication device according to claim 2, wherein
the one or more processors are further configured to perform as:
a timing determination unit configured to determine a transmission timing of a signal; and
a transmission unit configured to transmit the signal at the transmission timing, and
the rotation control unit drives the actuator at the transmission timing.

7. The wireless communication device according to claim 6, wherein
the rotation control unit drives the actuator until the transmission of the signal is completed.

* * * * *